United States Patent
Lashmore et al.

(10) Patent No.: US 8,722,171 B2
(45) Date of Patent: May 13, 2014

(54) NANOTUBE-BASED INSULATORS

(75) Inventors: David S. Lashmore, Lebanon, NH (US); Diana Lewis, Concord, NH (US)

(73) Assignee: Nanocomp Technologies, Inc., Merrimack, NH (US)

( * ) Notice: Subject to any disclaimer, the term of this patent is extended or adjusted under 35 U.S.C. 154(b) by 0 days.

(21) Appl. No.: 13/343,366

(22) Filed: Jan. 4, 2012

(65) Prior Publication Data

US 2012/0171411 A1 Jul. 5, 2012

Related U.S. Application Data

(60) Provisional application No. 61/429,680, filed on Jan. 4, 2011.

(51) Int. Cl.
*B32B 5/12* (2006.01)
*B32B 3/20* (2006.01)
*B32B 3/10* (2006.01)
*D06N 7/04* (2006.01)

(52) U.S. Cl.
USPC ........... 428/114; 428/188; 428/137; 428/141; 428/304.4; 428/408; 442/391; 29/887; 977/742

(58) Field of Classification Search
None
See application file for complete search history.

(56) References Cited

U.S. PATENT DOCUMENTS

| | | | |
|---|---|---|---|
| 5,747,161 A | 5/1998 | Iijima | |
| 6,376,971 B1 | 4/2002 | Pelrine et al. | |
| 6,426,134 B1 | 7/2002 | Lavin et al. | |
| 6,541,744 B2 | 4/2003 | Von Arx et al. | |
| 6,611,039 B2 | 8/2003 | Anthony et al. | |
| 6,706,402 B2 | 3/2004 | Rueckes et al. | |
| 6,784,656 B2 | 8/2004 | Breinlinger | |
| 6,908,572 B1 | 6/2005 | Derbyshire et al. | |
| 6,923,946 B2 | 8/2005 | Geohegan et al. | |
| 6,979,709 B2 | 12/2005 | Smalley et al. | |
| 7,182,929 B1 | 2/2007 | Singhal et al. | |
| 7,615,097 B2 | 11/2009 | McKechnie et al. | |
| 7,615,204 B2 | 11/2009 | Ajayan et al. | |

(Continued)

FOREIGN PATENT DOCUMENTS

| | | |
|---|---|---|
| CN | 1614772 | 5/2005 |
| EP | 1160861 | 12/2001 |

(Continued)

OTHER PUBLICATIONS

International Search Report for International Patent Application No. PCT/US2012/020194 mailed May 1, 2012.

(Continued)

*Primary Examiner* — David Sample
*Assistant Examiner* — Nicole T Gugliotta
(74) *Attorney, Agent, or Firm* — Greenberg Traurig, LLP; Chinh H. Pham; Roman Fayerberg

(57) ABSTRACT

A nanotube-based insulator is provided having thermal insulating properties. The insulator can include a plurality of nanotube sheets stacked on top of one another. Each nanotube sheet can be defined by a plurality of carbon nanotubes. The plurality of carbon nanotubes can be configured so as to decrease normal-to-plane thermal conductivity while permitting in-plane thermal conductivity. A plurality of spacers can be situated between adjacent nanotube sheets so as to reduce interlayer contact between the nanotubes in each sheet. The plurality of spacers can be ceramic or alumina dots or provided by texturing the nanotube sheets.

11 Claims, 6 Drawing Sheets

(56) References Cited

U.S. PATENT DOCUMENTS

| | | | |
|---|---|---|---|
| 7,745,810 | B2 | 6/2010 | Rueckes et al. |
| 7,846,414 | B2 | 12/2010 | Harbec et al. |
| 7,897,248 | B2 | 3/2011 | Barrera et al. |
| 8,071,906 | B2 | 12/2011 | Smiljanic et al. |
| 2002/0113335 | A1 | 8/2002 | Lobovsky et al. |
| 2004/0020681 | A1 | 2/2004 | Hjortstam et al. |
| 2004/0124772 | A1 | 7/2004 | Chen |
| 2004/0240144 | A1 | 12/2004 | Schott et al. |
| 2004/0265212 | A1 | 12/2004 | Varadan et al. |
| 2004/0265489 | A1 | 12/2004 | Dubin |
| 2005/0067406 | A1 | 3/2005 | Rajarajan et al. |
| 2005/0087222 | A1 | 4/2005 | Muller-Werth |
| 2005/0112051 | A1 | 5/2005 | Liu et al. |
| 2007/0009421 | A1 | 1/2007 | Kittrell et al. |
| 2007/0029291 | A1 | 2/2007 | Boulos et al. |
| 2007/0036709 | A1* | 2/2007 | Lashmore et al. ......... 423/447.1 |
| 2007/0048211 | A1 | 3/2007 | Jiang et al. |
| 2007/0056855 | A1 | 3/2007 | Lo et al. |
| 2007/0087121 | A1 | 4/2007 | Chang et al. |
| 2007/0236325 | A1 | 10/2007 | Bertin et al. |
| 2007/0277866 | A1 | 12/2007 | Sander et al. |
| 2008/0238882 | A1 | 10/2008 | Sivarajan et al. |
| 2009/0044848 | A1 | 2/2009 | Lashmore et al. |
| 2009/0237886 | A1 | 9/2009 | Iwai et al. |
| 2010/0000754 | A1* | 1/2010 | Mann et al. ..................... 174/34 |
| 2010/0041297 | A1 | 2/2010 | Jiang et al. |
| 2010/0219383 | A1 | 9/2010 | Eklund |
| 2010/0220074 | A1 | 9/2010 | Irvin, Jr. et al. |
| 2010/0243295 | A1 | 9/2010 | Allemand et al. |
| 2010/0270058 | A1 | 10/2010 | Mahoney et al. |
| 2010/0328845 | A1 | 12/2010 | Hiralal et al. |
| 2011/0007477 | A1 | 1/2011 | Xu et al. |
| 2012/0045385 | A1 | 2/2012 | Lashmore et al. |
| 2012/0118552 | A1 | 5/2012 | White et al. |

FOREIGN PATENT DOCUMENTS

| | | |
|---|---|---|
| JP | 1958-072036 | 5/1983 |
| JP | 2000-058228 | 2/2000 |
| JP | 2004-315297 | 11/2004 |
| JP | 2005-075672 | 3/2005 |
| JP | 2005-281672 | 10/2005 |
| JP | 2006-335604 | 12/2006 |
| KR | 2005-0007886 | 1/2005 |
| WO | WO 2006/069007 | 6/2006 |
| WO | WO 2007/003879 | 1/2007 |
| WO | WO 2007/015710 | 2/2007 |
| WO | WO 2007/089118 | 8/2007 |
| WO | WO 2006/099156 | 9/2009 |

OTHER PUBLICATIONS

Gou, J.G., "Passage: Nanotube Bucky Papers and Nanocomposites", Ph.D. Dissertation, Marburg An Der Lahn, pp. 93-126, Jan. 1, 2002.
Pipes et al., "Helical carbon nanotube arrays: mechanical properties," Composites Science and Technology. 62: 419-428 (2002).
Canadian Search Report for Canadian Patent Application No. 2,609,712 mailed Jul. 30, 2012.
European Search Report for European Patent Application No. 10160098.9 mailed Mar. 9, 2012.
European Search Report for European Patent Application No. 12160856.6 mailed May 10, 2012.
European Search Report for European Patent Application No. 08726128.5 mailed Aug. 10, 2012.
International Search Report for International Patent Application No. PCT/US12/20194 mailed May 1, 2012.
International Search Report for International Patent Application No. PCT/US12/33300 mailed Jul. 5, 2012.
Japanese Office Action issued for Japanese Patent Application No. 2009-551705 mailed on May 29, 2012.
Office Action issued for Australian Patent Application No. 2008311234 mailed on Feb. 14, 2012.
Office Action issued for U.S. Appl. No. 12/038,408 mailed on Feb. 23, 2012.
Office Action issued for U.S. Appl. No. 12/580,994 mailed on Mar. 12, 2012.
Office Action issued for U.S. Appl. No. 12/437,538 mailed on Mar. 26, 2012.
Office Action issued for U.S. Appl. No. 12/566,229 mailed on May 4, 2012.
Office Action issued for U.S. Appl. No. 12/437,535 mailed on Aug. 22, 2012.

* cited by examiner

NANOTUBE-BASED INSULATORS

RELATED U.S. APPLICATION(S)

The present application claims priority to and the benefit of U.S. Application Ser. No. 61/429,680, filed Jan. 4, 2011, which application is hereby incorporated herein by reference in its entirety.

GOVERNMENT SUPPORT

The invention is supported, in whole or in part, by the U.S. Government under contract Number: NRO 000-09-C-0185. The Government may have certain rights in the invention.

TECHNICAL FIELD

The present invention relates to insulators, and more particularly, to insulators made from a plurality of carbon nanotube (CNT) sheets positioned on top of one another, and designed to promote, enhanced thermal insulation properties, among other things.

BACKGROUND ART

Within the last fifteen (15) years, as the properties of carbon nanotubes have been better understood, interests in carbon nanotubes have greatly increased within and outside of the research community. One key to making use of these properties is the synthesis of nanotubes in sufficient quantities for them to be used industrially. For example, large quantities of carbon nanotubes may be needed if they are to be used as high strength components of CNTs in macroscale three-dimensional structures (i.e., structures having dimensions greater than about 1 cm).

Carbon nanotubes are known to have extraordinary tensile strength, including high strain to failure and relatively high tensile modulus. Carbon nanotubes may also be highly electrically and thermally conductive while being resistant to fatigue, radiation damage, and heat. For example, carbon nanotubes can be good thermal conductors along the tube, where each individual tube can have thermal conductivities potentially in excess of 2000 W/m·K. However, this conductivity is anisotropic, exhibiting properties with different values when measured in different directions and is dramatically reduced when a large ensemble of tubes are used in a sheet or mat.

Accordingly, it would be desirable to provide a material that can take advantage of the characteristics and properties of carbon nanotubes, so that efficient and light-weight devices, such as shielding and/or thermal insulators, can be manufactured in a cost-effective manner.

SUMMARY OF THE INVENTION

The present invention features, in one aspect, an insulator made from nanotubes. In an embodiment, the insulator includes a plurality of carbon nanotube (CNT) sheets stacked on top of one another. The CNT sheets can be non-woven CNT sheets or woven from a plurality of CNT yarns. In some embodiments, each CNT sheet can be defined by a plurality of non-woven carbon nanotubes, and/or a plurality of layers of carbon nanotubes. The carbon nanotubes, in an embodiment, can be so configured as to maintain or increase in-plane thermal conductivity while minimizing normal-to-plane thermal conductivity. In some embodiments, the carbon nanotubes can be substantially aligned in-plane to maintain the in-plane thermal conductivity in one direction. Each CNT sheet, in an embodiment, can include a dopant to decrease normal-to-plane thermal conductivity. In some examples, the dopant can be boron (e.g., about 0.5 to about 5% weight percent, or about 2% weight percent), carbon 13, an irradiated CNT material, or a combination thereof. In addition, a plurality of spacers can be situated between adjacent CNT sheets in order to reduce interlayer contact of carbon nanotubes, so as to further minimize normal-to-plane thermal conductivity. The spacers, in some embodiments, can be alumina or ceramic dots sprayed between adjacent CNT sheets, a plurality of holes on each CNT sheet, a porous layer of non-metal material having poor thermal conductivity and positioned between adjacent CNT sheets, a texture in each CNT sheet to define a rough surface having peaks and valleys thereon so as to minimize surface contact between adjacent CNT sheets, or any combination thereof.

In another aspect, the present invention provides a process for making an insulator. In an embodiment, the process includes: (1) providing a sheet having a plurality of nanotubes; (2) when desired, processing the nanotube sheet to substantially align the plurality of nanotubes within the sheet, so as to maintain in-plane thermal conductivity while minimizing normal-to-plane thermal conductivity and providing an anisotropy to in plane thermal conductivity; (3) positioning a spacer between adjacent nanotube sheets, so as to further minimize normal-to-plane thermal conductivity.

The present invention, in yet another aspect, features use of the nanotube material as a thermal insulator possessing multifunctional properties such as EMI shielding, EMP protection, ESD shielding, electrical conduction, impact resistance, and corrosion resistance along with the desired thermal properties.

These and other features and advantages of the present invention will become more apparent from the following description taken in conjunction with the accompanying drawings wherein like reference characters denote corresponding parts throughout the several views.

DETAILED DESCRIPTION OF SPECIFIC EMBODIMENTS

Figure 1A:
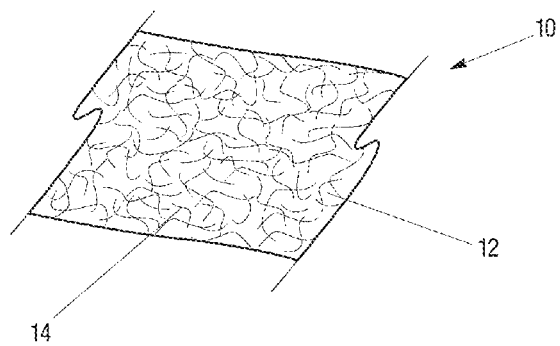
FIGS. 1A-1B illustrate a nanotube sheet in accordance with an embodiment of the present invention.

The present invention provides, in one embodiment, an insulator made from nanotubes. In an embodiment, the insulator includes a plurality of carbon nanotube (CNT) sheets stacked or layered on top of one another. The CNT insulator possesses multifunctional properties that can promote thermal insulation, EMI, EMP, EDS shielding, and optical absorption, among other things. In an embodiment, each CNT sheet is defined by a plurality of carbon nanotubes configured so as to minimize normal-to-plane thermal conductivity through the CNT sheet. In certain embodiments, a spacer can be situated between adjacent CNT sheets to further minimize normal-to-plane thermal conductivity.

Presently, there exist multiple processes and variations thereof for growing nanotubes, and forming CNT sheets, yarns or cable structures. These include: (1) Chemical Vapor Deposition (CVD), a common process that can occur at near ambient or at high pressures, and at temperatures above about 400° C., (2) Arc Discharge, a high temperature process that can give rise to tubes having a high degree of perfection, (3) Laser ablation and forest growth on a substrate. Any of these methods can be used for the formation of CNTs that can be post processed into a non-woven sheet or textile (e.g., Bucky Paper or CNT sheets directly fabricated from the CVD reactor).

The present invention, in one embodiment, employs a CVD process or similar gas phase pyrolysis procedures to generate the appropriate sheet type materials made from carbon-based nanostructures, including carbon nanotubes. Carbon nanotubes, including single wall (SWNT), double wall (DWNT), and multiwall (MWNT), may be grown, in an embodiment of the present invention, by exposing nanoscaled catalyst particles in the presence of reagent carbon-containing gases (i.e., gaseous carbon source at elevated temperatures). In particular, the nanoscaled catalyst particles may be introduced into the reagent carbon-containing gases, either by addition of existing particles or by in situ synthesis of the particles from a metal-organic precursor, or even non-metallic catalysts. Although SWNT, DWNT, and MWNT may be grown, in certain instances, SWNT may be selected due to their relatively higher growth rate and tendency to form rope-like structures, which may offer advantages in handling, thermal conductivity, electronic properties, and strength. In other instances, DWNT or MWCNTs may be grown for thermal properties that are advantageous for thermal applications, such as insulators.

The strength of the nanotubes generated in connection with the present invention may be about 30 GPa or more. Strength, as should be noted, is generally sensitive to defects. However, the elastic modulus of the carbon nanotubes fabricated in accordance with an embodiment of the present invention may not be sensitive to defects and can vary from about 1 to about 1.2 TPa. Moreover, the strain to failure, which generally can be a structure sensitive parameter, may range from about 10% to about 25% for carbon nanotubes used in the present invention.

Furthermore, the nanotubes of the present invention can be provided with relatively small diameter. In an embodiment of the present invention, the nanotubes fabricated in the present invention can be provided with a diameter in a range of from less than 1 nm to about 10 nm.

In various embodiments, materials made from nanotubes of the present invention can represent a significant advance over copper and other metallic conducting members, as such materials are isotropic heat conductors. In addition, CNT sheets made in accordance with an embodiment of the present invention can be a good thermal insulator in a direction normal (e.g., transverse) to the plane of the CNT sheet, while being a good thermal conductor in the plane of the CNT sheet. Additional anisotropy can be introduced within the plane by stretching the sheets. Not wishing to be bound by theory, heat transport for a carbon nanotube may be predominantly phonon based at certain temperatures. When the carbon nanotubes are formed into a large sheet, phonons need to transport across all the physical contact points or spots between tubes. Therefore, overall heat transport can be reduced if many of the tubes or tube bundles are not substantially aligned in the heat flow direction and some adjacent tubes do not have physical contacts. As such, the CNT insulator of the present invention can be used as a thermal insulator, while being conductive in plane and substantially immune to mechanical damage.

Figure 1B:
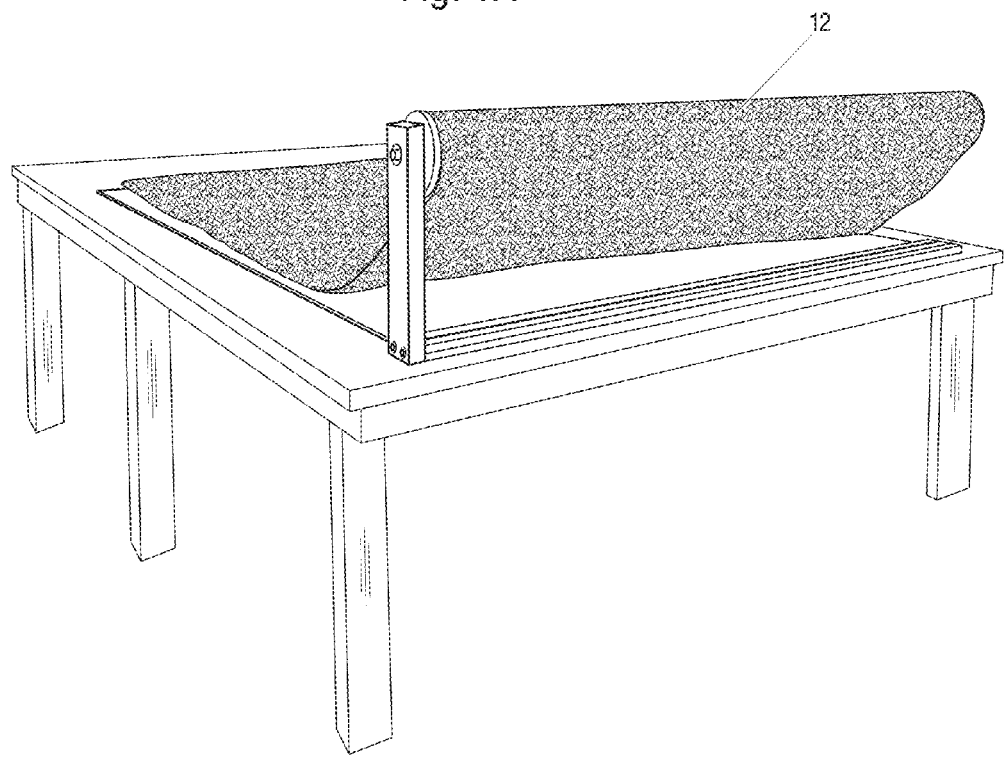
Figure 2:
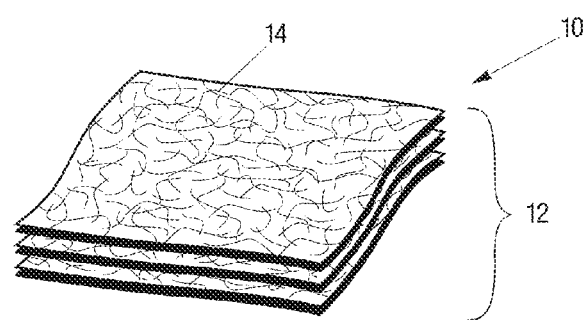
FIG. 2 illustrates a nanotube-based insulator in accordance with one embodiment of the present invention.

Looking now at FIGS. 1A-B, the present invention provides, in an embodiment, a CNT insulator 10 made from a nanostructured CNT sheet 12. The CNT insulator 10 can be so designed to minimize thermal conductivity through the CNT sheet 12, i.e., in a direction normal to the CNT sheet 12, while, to the extent desired, permitting thermal conductivity along the length of the CNT sheet 12, i.e., within the plane of the CNT sheet 12. As shown in FIG. 1A, the CNT insulator 10 may include a substantially planar body in the form of a single CNT sheet 12. The sheet 12 may, in one embodiment, be a single layer of non-woven carbon nanotubes 14, or alternatively be multiple layers 51 of non-woven nanotubes (see FIG. 5). In another embodiment, as shown in FIG. 2, the CNT insulator 10 can include a plurality CNT sheets 12 layered or stacked on top of one another. In some embodiments, the CNT insulator 10 can include spacers and/or texturing designs between adjacent sheets 12 to minimize sheet to sheet contact.

In accordance with an embodiment of the present invention, some or all of the CNT sheets 12 used in the formation of CNT insulator 10 may be processed (e.g., doped) to contain a dopant. A dopant can be any material that can cause phonon scattering, so as to decrease thermal transport. Suitable dopants include, for example, boron, carbon 13, irradiated CNT materials, or any combination thereof. Other post-production modification and/or layering methods may also be applied to modify a thermal conductivity of the CNT insulator. For example, the plurality of carbon nanotubes 14 can be physically and/or chemically configured to increase in-plane thermal conductivity and to decrease normal-to-plane thermal conductivity. In some embodiments, a plurality of spaces can be introduced between adjacent CNT sheets 12 so as to reduce interlayer thermal contacts, thereby reducing normal-to-plane thermal conductivity.

It should be noted that although reference is made throughout the application to nanotubes synthesized from carbon, other compound(s), such as boron, $MoS_2$, $WS_2$, $NS_2$ or a combination thereof may be used in the synthesis of nanotubes in connection with the present invention. For instance, it should be understood that boron nanotubes may also be grown, but with different chemical precursors. In addition, it should be noted that boron may also be used to reduce resistivity in individual carbon nanotubes at higher temperatures. Furthermore, other methods, such as plasma CVD or the like, can also be used to fabricate the nanotubes of the present invention.

System for Fabricating Sheets

Figure 3:
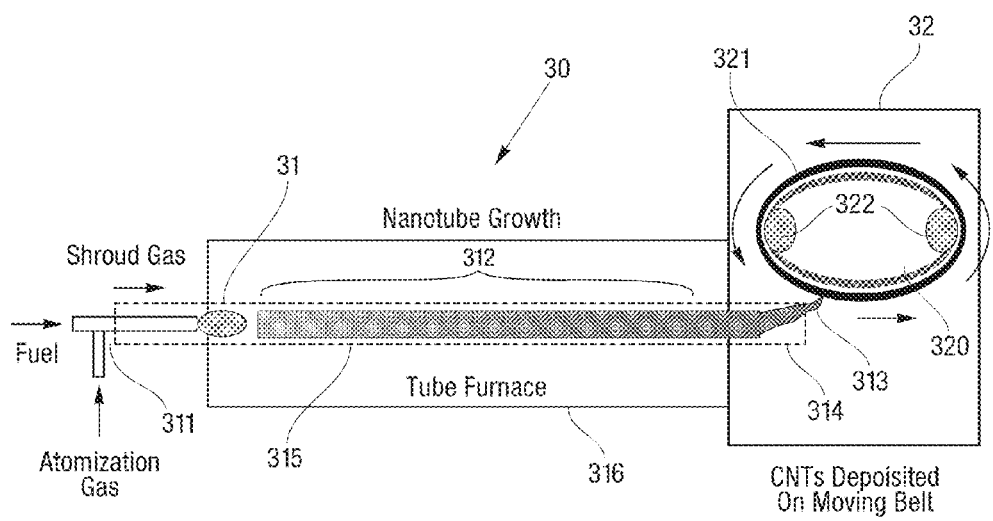
FIG. 3 illustrates a system for fabricating nanotubes and nanotube sheets, in accordance with one embodiment of the present invention.

With reference now to FIG. 3, there is illustrated a system 30, similar to that disclosed in U.S. Pat. No. 7,993,620 (incorporated herein by reference), for use in the fabrication of nanotubes. System 30, in an embodiment, may include a synthesis chamber 31. The synthesis chamber 31, in general, includes an entrance end 311, into which reaction gases (i.e., gaseous carbon source) may be supplied, a hot zone 312, where synthesis of nanotubes 313 may occur, and an exit end 314 from which the products of the reaction, namely a cloud of nanotubes and exhaust gases, may exit and be collected. The synthesis chamber 31, in an embodiment, may include a quartz tube, a ceramic tube or a FeCrAl tube 315 extending through a furnace 316. The nanotubes generated by system 30, in one embodiment, may be individual single-walled nanotubes, bundles of such nanotubes, and/or intermingled or intertwined single-walled nanotubes, all of which may be referred to hereinafter as "non-woven."

System 30, in one embodiment of the present invention, may also include a housing 32 designed to be substantially fluid (e.g., gas, air, etc.) tight, so as to minimize the release of potentially hazardous airborne particulates from within the synthesis chamber 31 into the environment. The housing 32 may also act to prevent oxygen from entering into the system 30 and reaching the synthesis chamber 31. In particular, the presence of oxygen within the synthesis chamber 31 can affect the integrity and can compromise the production of the nanotubes 313.

System 30 may also include a moving belt 320, positioned within housing 32, designed for collecting synthesized nanotubes 313 generated from within synthesis chamber 31 of system 30. In particular, belt 320 may be used to permit nanotubes collected thereon to subsequently form a substantially continuous extensible structure 321, for instance, a CNT sheet. Such a CNT sheet may be generated from compacted, substantially non-aligned, non-woven nanotubes 313, with sufficient structural integrity to be handled as a sheet. Belt 320, in an embodiment, can be designed to translate back and forth in a direction substantially perpendicular to the flow of gas from the exit end 314, so as to increase the width of the CNT sheet 321 being collected on belt 320.

Figure 4A:
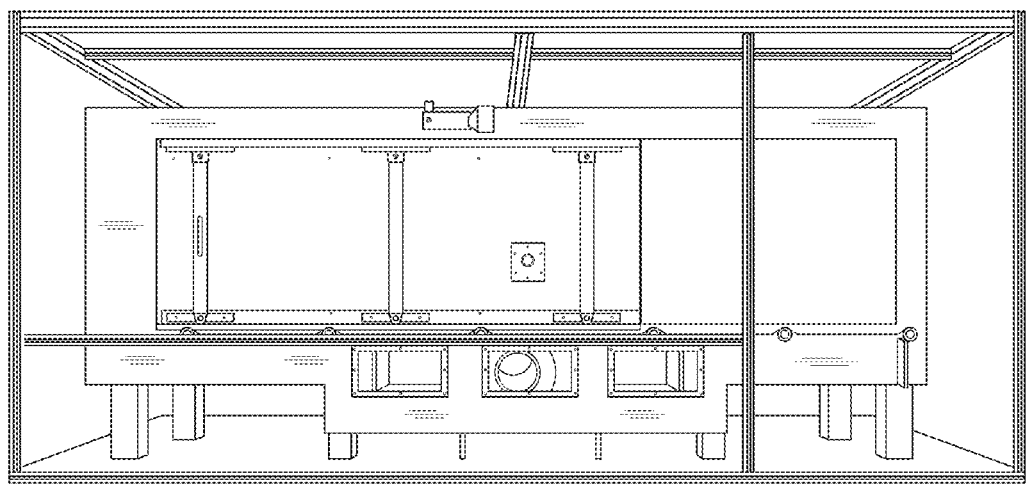
FIGS. 4A-4D illustrates a system of the present invention for formation and harvesting of nanotubes.
Figure 4B:
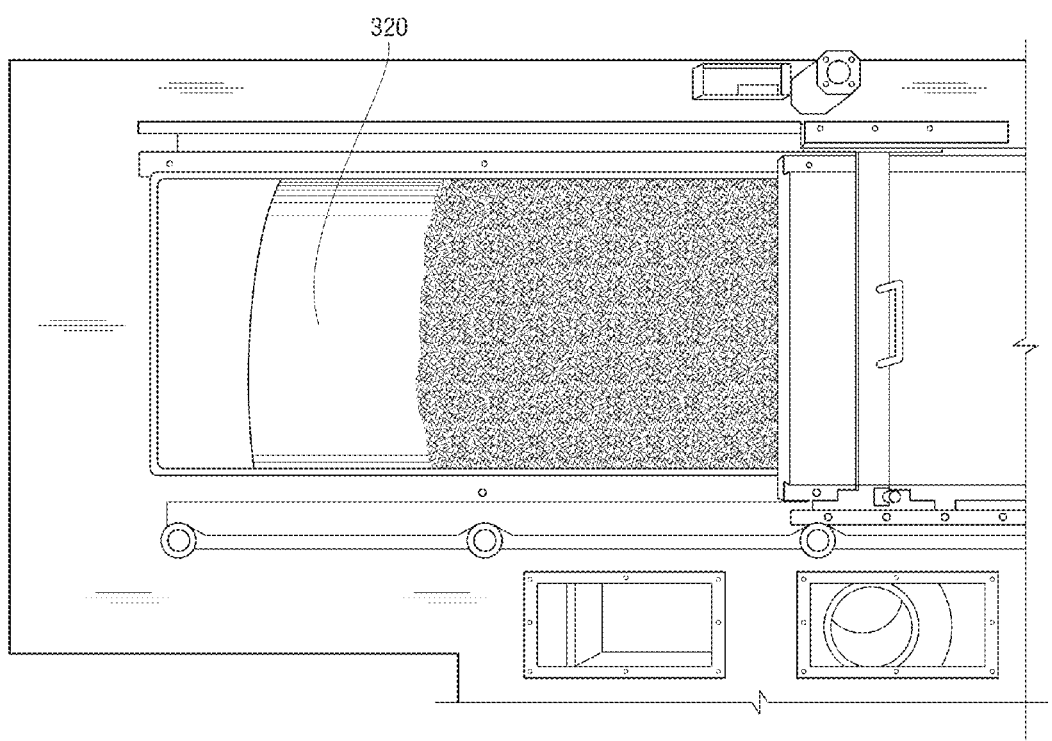
Figure 4C:
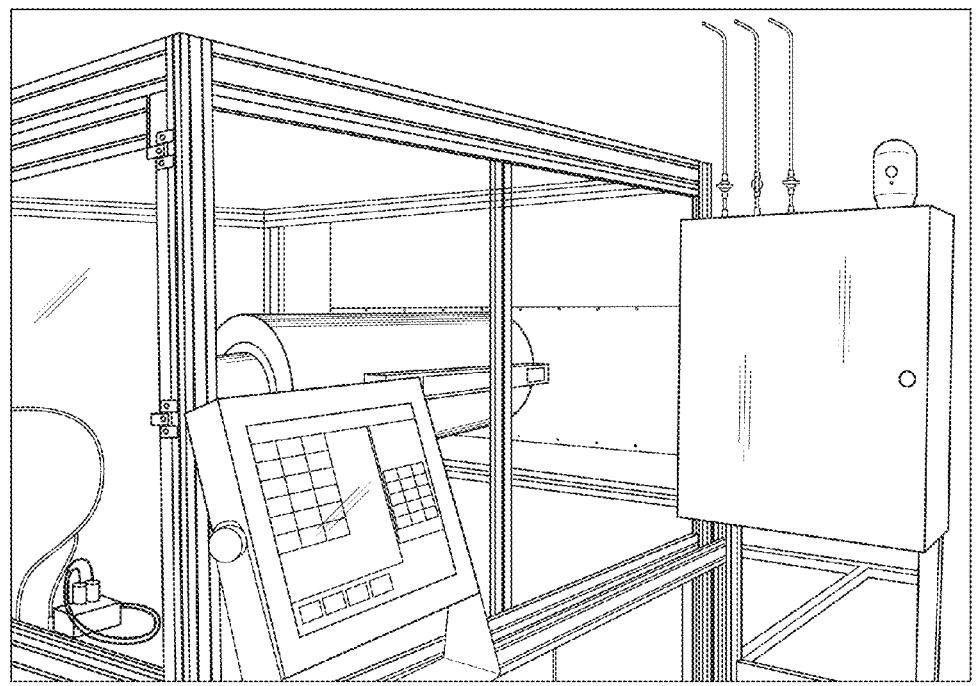
Figure 4D:
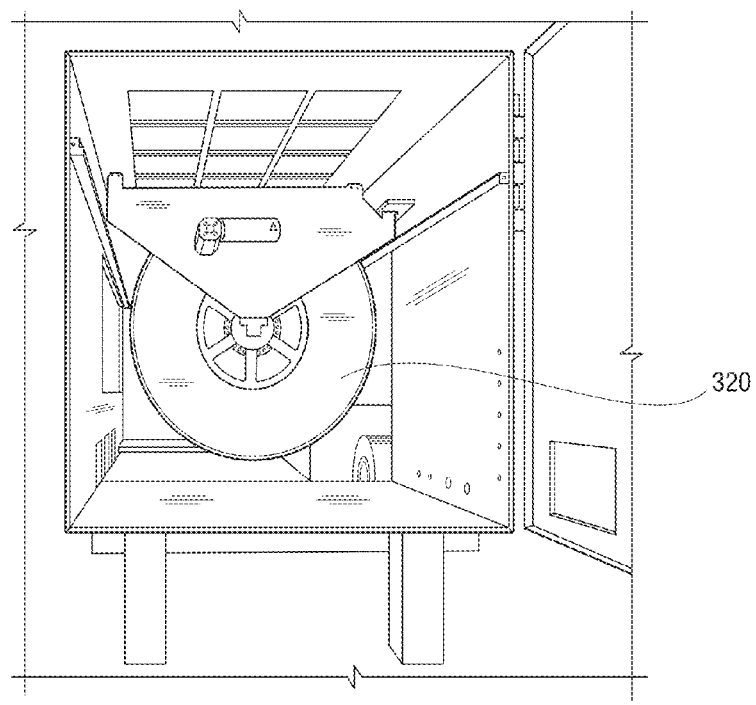

To collect the fabricated nanotubes 313, belt 320 may be positioned adjacent the exit end 314 of the synthesis chamber 31 to permit the nanotubes to be deposited on to belt 320. In one embodiment, belt 320 may be positioned substantially parallel to the flow of gas from the exit end 314, as illustrated in FIG. 3. Alternatively, belt 320 may be positioned substantially perpendicular to the flow of gas from the exit end 314 and may be porous in nature to allow the flow of gas carrying the nanomaterials to pass therethrough. In one embodiment, belt 320 can be designed to translate from side to side in a direction substantially perpendicular to the flow of gas from the exit end 314, so as to generate a sheet that is substantially wider than the exit end 314. Belt 320 may also be designed as a continuous loop, similar to a conventional conveyor belt, such that belt 320 can continuously rotate about an axis, whereby multiple layers of CNT can be deposited on belt 320. To that end, belt 320, in an embodiment, may be looped about opposing rotating elements 322 and may be driven by a mechanical device, such as an electric motor. Alternatively, belt 320 may be a rigid cylinder, such as the drum shown in FIG. 4B. In one embodiment, the motor device may be controlled through the use of a control system, such as a computer or microprocessor, so that tension and velocity can be optimized. The deposition of multiple layers of CNT in formation of sheet 321, in accordance with one embodiment of the present invention, can result in minimizing interlayer contacts between nanotubes. Specifically, nanotubes in each distinct layer of sheet 321 tend not to extend into an adjacent layer of sheet 321. As a result, normal-to-plane thermal conductivity can be minimized through sheet 321.

In various embodiments, system 30 may also include a pressure applicator, such as roller (not shown), situated adjacent belt to apply a compacting force (i.e., pressure) onto the collected nanomaterials. In particular, as the nanomaterials are rotated on belt 320 toward the roller, the nanomaterials on belt 320 may be forced to move under and against roller, such that a pressure may be applied to the intermingled nanomaterials while the nanomaterials get compacted between the belt and roller into a coherent substantially-bonded CNT sheet 321. To enhance the pressure against the nanomaterials on belt 320, a plate (not shown) may be positioned behind belt 320 to provide a hard surface against which pressure from the roller can be applied. It should be noted that the use of a roller may not be necessary should the collected nanomaterials be ample in amount and sufficiently intermingled, such that an adequate number of contact sites exists to provide the necessary bonding strength to generate the CNT sheet 321.

To disengage the CNT sheet 321 of intermingled non-woven nanomaterials from belt 320 for subsequent removal from housing 32, a blade (not shown) may be provided adjacent the roller with its edge against surface of belt 320. In this manner, as CNT sheet 321 is rotated on belt 320 past the roller, the blade may act to lift the CNT sheet 321 from surface of belt 320. In an alternate embodiment, a blade does not have to be in use to remove the CNT sheet 321. Rather, removal of the CNT sheet may be by hand or by other known methods in the art.

Additionally, a spool (not shown) may be provided downstream of blade, so that the disengaged CNT sheet 321 may subsequently be directed thereonto and wound about the spool for harvesting. As the CNT sheet 321 is wound about the spool, a plurality of layers of CNT sheet 321 may be formed. Of course, other mechanisms may be used, so long as the CNT sheet 321 can be collected for removal from the housing 32 thereafter. The spool, like belt 320, may be driven, in an embodiment, by a mechanical drive, such as an electric motor, so that its axis of rotation may be substantially transverse to the direction of movement of the CNT sheet 321.

In order to minimize bonding of the CNT sheet 321 to itself as it is being wound about the spool, a separation material may be applied onto one side of the CNT sheet 321 prior to the sheet being wound about the spool. The separation material for use in connection with the present invention may be one of various commercially available metal sheets or polymers that can be supplied in a continuous roll. To that end, the separation material may be pulled along with the CNT sheet 321 onto the spool as sheet is being wound about the spool. It should be noted that the polymer comprising the separation material may be provided in a sheet, liquid, or any other form, so long as it can be applied to one side of CNT sheet 321. Moreover, since the intermingled nanotubes within the CNT sheet 321 may contain catalytic nanoparticles of a ferromagnetic material, such as Fe, Co, Ni, etc., the separation material, in one embodiment, may be a non-magnetic material, e.g., conducting or otherwise, so as to prevent the CNT sheet from sticking strongly to the separation material. In an alternate embodiment, a separation material may not be necessary.

After the CNT sheet 321 is generated, it may be left as a CNT sheet or it may be cut into smaller segments, such as strips. In an embodiment, a laser may be used to cut the CNT sheet 321 into strips as the belt 320 or drum rotates and/or simultaneously translates. The laser beam may, in an embodiment, be situated adjacent the housing 32 such that the laser may be directed at the CNT sheet 321 as it exits the housing 32. A computer or program may be employed to control the operation of the laser beam and also the cutting of the strip. In an alternative embodiment, any mechanical means or other means known in the art may be used to cut the CNT sheet 321 into strips.

Figure 5:
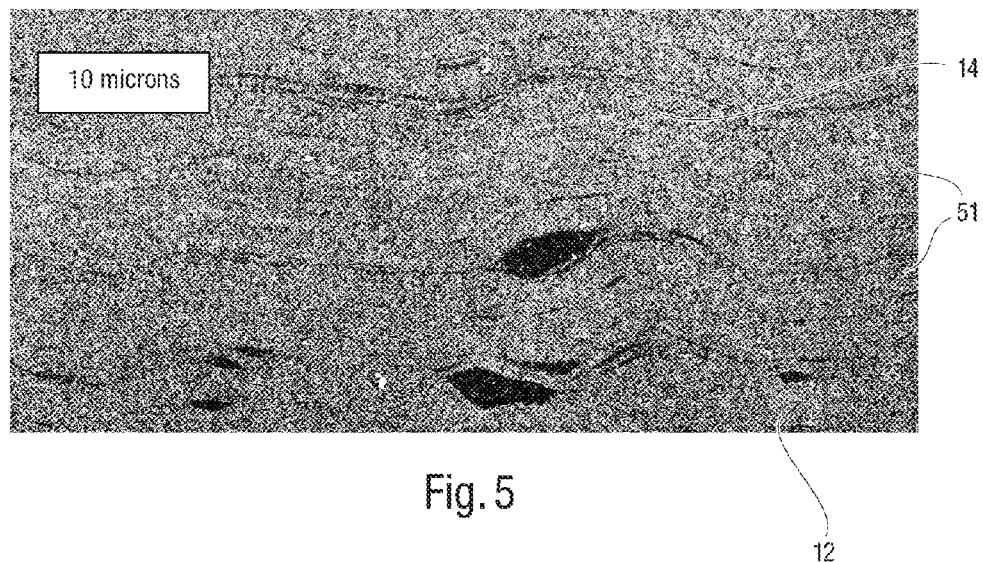
FIG. 5 illustrates a cross section of a nano-based insulator made in accordance with one embodiment of the present invention.

A system suitable for use in accordance with the present invention is shown in FIGS. 4A-4D. The CNT insulator produced by such system can be collected as a non-woven sheet on a moving belt 320 or drum. Such production method can provide, in a CNT sheet, a plurality of carbon nanotubes 14, which can subsequently be made to be substantially aligned in-plane, as will be discussed below. The carbon nanotubes 14, in an embodiment, can be deposited in multiple distinct layers 51 to form a multilayered structure or morphology in a single CNT sheet 12, as shown in FIG. 5. In some embodiments, the CNT sheet can have a low normal-to-plane or through-thickness thermal conductivity, which may result from inter-tube resistance.

In some embodiments, the normal-to-plane or through-thickness thermal conductivity can be further reduced using various modifications, including (but not limited to) doping, post-production processing and layering sheets. Fabrication of sheets from multiwall CNTs can also reduce thermal conductivity.

Doping to Reduce Thermal Conductivity

A strategy for reducing through-plane thermal conductivity of the nanotube sheets or yarns of the present invention, in an embodiment, includes introducing an amount of dopant (e.g., foreign atoms) during the nanotube growth process (e.g., in situ doping). In an embodiment, a trace amount of the dopant may be used. Such dopant may substitute for carbon used to generate the carbon nanotubes and decrease inter-tube thermal conductivity. Any known protocols and devices available in the art can be employed and incorporated into the CNT growth process of the present invention. For example, a dopant can be dispersed among the nanotubes using known methods. Substitutional dopants might include $C_{13}$, a larger isotope of carbon, or boron.

In an alternate embodiment, post-growth doping of a collected nanotube sheet can also be utilized. Post-growth doping, in one embodiment, may be achieved by heating a sample of nanotubes in an $N_2$ environment to about 1500° C. for up to about 4 hours. In addition, placing the carbon nanotube material over a crucible of $B_2O_3$ at these temperatures can also allow for boron doping of the material, which can be done concurrently with $N_2$ to create $B_xN_yC_z$ nanotubes.

Examples of dopants which may have an effect in reducing conductivity in individual nanotubes include, but are not limited to, boron, nitrogen, boron-nitrogen, carbon 13, irradiated material, or other foreign atoms that can cause phonon scattering. Dopants can also include ozone, potassium and other alkali metals, and bromine.

In one embodiment, boron doping may alter characteristics of the nanotubes. For example, boron doping can introduce p-type behavior into the inherently n-type nanotube. In particular, boron-mediated growth using $BF_3$/MeOH as the boron source has been observed to have an important effect on the electronic properties of the nanotubes. Other potential sources useful for boron doping of nanotubes include, but are not limited to $B(OCH_3)_3$, $B_2H_6$, and $BCl_3$.

Figure 6:
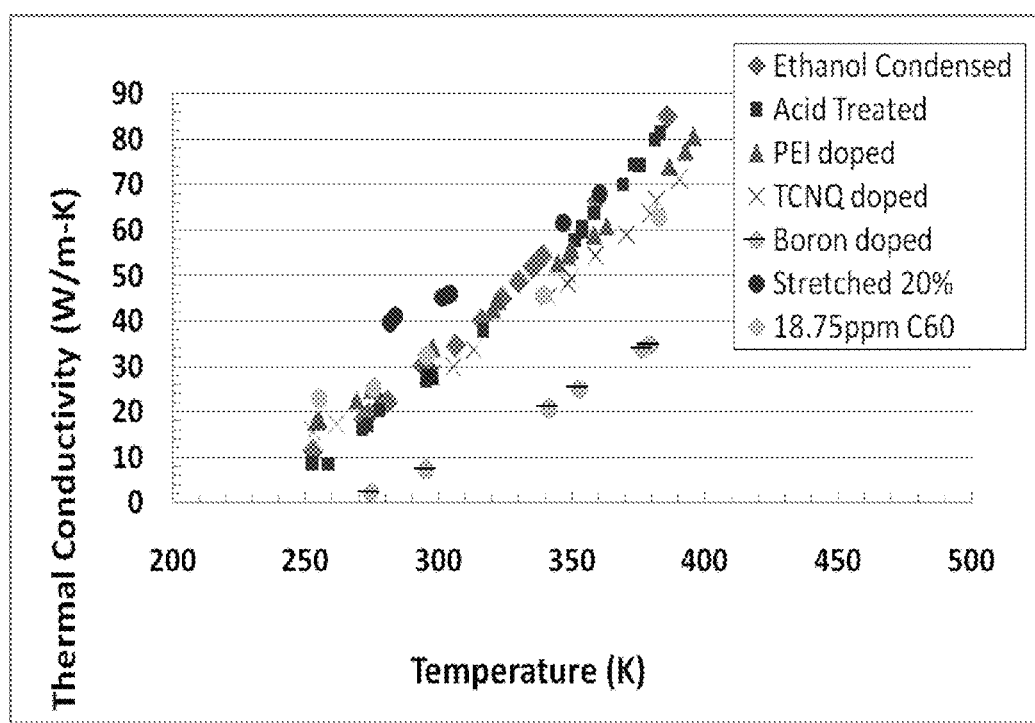
FIG. 6 illustrates conductivity of the nanotube sheets in relation to temperature in accordance of one embodiment of the present invention.

As shown in FIG. 6, doping with 2% boron can decrease the thermal conductivity of CNT sheet, as compared to other treatments such as ethanol condensed, acid treated, polyethyleneimine (PEI) doped, tetracyano-p-quinodimethane (TCNQ) doped, stretched by 20%, and 18.75 ppm $C_{60}$ treated. Thermal conductivity (W/m·K, y axis) as a function of temperature (K, x axis) is shown. Boron containing CNT sheet insulator has a lower thermal conductivity value at various temperature points than the other materials tested.

Post-Production Treatments

Once a CNT sheet is generated, the CNT sheet may undergo various treatments to modify its properties to further enhance the reduction of normal-to-plane thermal conductivity. Post production modifications, in accordance with an embodiment of the present invention, can focus on decreasing the number of through-plane tube contacts and increasing inter-tube spacing (i.e., spacing between adjacent nanotubes) so as to yield measurably lower normal-to-plane or through-plane thermal conductivities. Suitable modifications include, but are not limited to in-plane alignment of CNTs, polymer infiltration, hydrogen evolution, metal composite, or any combination thereof.

In one embodiment, orientation of the nanotubes in the CNT sheet can be modified to be substantially aligned along the length of the CNT sheet. For example, mechanical stretching of the CNT sheet, strip, or textile-like felt material can align the carbon nanotubes in the plane of the CNT sheet, to permit in-plane thermal conductivity. However, stretching can also reduce the number of conduction paths through-plane by decreasing the number of contact points between nanotubes, so as to reduce normal-to-plane or through-plane thermal conductivity.

The CNT insulator of the present invention, in an embodiment, can also be infused with polymers. For example, an appropriately chosen polymer can permeate within the spaces between individual nanotubes, thereby disrupting inter-tube contacts, so as to minimize normal-to-plane thermal conductivity. Examples of a polymer that can be used include a small molecule or polymer matrix (thermoset or thermoplastic) including, but not limited to, polyurethane, polyethylene, poly(styrene butadiene), polychloroprene, poly(vinyl alcohol), poly(vinyl pyrrolidone), poly(acrylonitrile-co-butadiene-co-styrene), epoxy, polyureasilazane, bismaleimide, polyamide, polyimide, polycarbonate, or any monomer including styrene, divinyl benzene, methyl acrylate, and tert-butyl acrylate. The polymer can be supplied, in one embodiment, in a liquid form (e.g., in a solvent). In another embodiment, the polymer may include polymer particles, that may be difficult to obtain in liquid form.

In another embodiment, the CNT sheet, strip, or felt can be treated in an electroplating solution to evolve hydrogen therewithin, creating voids or separations between adjacent tubes that may lower thermal conductivity in a normal-to-plane direction. The sheet of carbon nanotubes, in an embodiment, can act as a hydrogen electrode for storage of hydrogen atoms and/or molecules. For example, there can be absorption and/or adsorption of hydrogen atoms or hydrogen molecules onto the carbon nanotubes. The electroplating solution can be any suitable solution generally known in the art, e.g., any alkaline solution. In one example, the electrolysis of a potassium hydroxide solution can be used to produce hydrogen atoms and/or molecules that can be absorbed by the CNT sheet.

In a further embodiment, compositing the CNT sheets with small amounts of metal may also reduce thermal conductivity in a normal-to-plane direction. In an embodiment, the metal may be aluminum, nickel, gold, titanium or the like. Metal composite can be made from a salt (any transition metal, alkali metal, or alkali earth metal salt or mixture thereof including, but not limited to, nickel hydroxide, cadmium hydroxide, nickel chloride, copper chloride, calcium zincate ($CaZn_2(OH)_6$)), or metal oxide (any transition metal, alkali metal, or alkali earth metal oxide or mixture thereof, including but not limited to: zinc oxide, iron oxide, silver oxide, copper oxide, manganese oxide, $LiCoO_2$, $LiNiO_2$, $LiNi_xCo_{1-x}O_2$, $LiMn_2O_4$).

For example, aluminum or its alloys can be used to create a foam structure on a surface of the CNT sheet and/or among the nanotubes within the sheet. The foam structure, in an embodiment, can be combined with other methods for creating voids or separations (such as polymer infiltration and/or hydrogen evolution) to decrease thermal conductivity in a normal-to-plane direction. In an embodiment, the metal may include polymers or volatile solvents to create a carbon nanotube metal matrix CNT. Examples of such metal include powdered forms of aluminum or its alloys, nickel, superalloys, copper, silver, tin, cobalt, iron, iron alloys, or any element that can be produced in a powdered form including complex binary and ternary alloys or even superconductors.

The solution, particles or powder noted above, in an embodiment, may be sprayed on the CNT sheet as it exits the furnace and is collected on the belt. Other methods for deposition can also be used, for instance, the CNT sheet can be dipped into a bath or reservoir of solution, particles or powder. The spray, in one embodiment, may contain other compounds that cover the outer surface of the nanotubes in such a manner as to enhance alignment of the carbon nanotubes and reduce the inter-tube contacts.

In an embodiment, the spray may include a solvent, a polymer, a metal, or a combination thereof. The solvent used in connection with the solution of the present invention can be used to lubricate the sheet in order to gain better alignment and enhancement in the properties of the carbon nanotubes. Examples of a solvent that can be used in connection with the solution include toluene, kerosene, benzene, hexanes, any alcohol including but not limited to ethanol, methanol, butanol, isopropanol, as well as tetrahydrofuran, 1-methyl-2-pyrrolidinone, dimethyl formamide, methylene chloride, acetone or any other solvent as the present invention is not intended to be limited in this manner. In an embodiment, the solvent may be used as a carrier for a polymer, monomer, inorganic salt, or metal oxide to.

Once the CNT sheet has been treated, the treated sheet may be subject to a heat source for processing of the sheet. For example, the sheet may be subject to sintering, hot isostatic pressing, hot pressing, cold isostatic pressing so as to yield the desired form of the final product.

Another source of dopants for use in connection with an embodiment of the present invention is nitrogen. Nitrogen doping may be done by adding melamine, acetonitrile, benzylamine, or dimethylformamide to the catalyst or carbon source. Carrying out carbon nanotube synthesis in a nitrogen atmosphere can also lead to small amounts of N-doping.

Layering Sheets to Reduce Normal to the Plane Thermal Conductivity

Each CNT sheet, in one embodiment, can be made with varying thicknesses and/or a number of layers of CNT. Individual CNT sheets can be, in an embodiment, about 30 microns in thickness. Of course, individually thicker or thinner CNT sheets can be provided, as desired. Alternatively, a plurality of CNT sheets can be stacked or layered on top of one another to achieve a more substantial thickness. The use of an individual CNT sheet or the use of a plurality of stacked or layered CNT sheets can result in a CNT insulator that has any desired thickness, shape, size, and/or profile. Moreover, although the presence of the distinct layers within one CNT sheet can reduce normal-to-plane. i.e., through-plane, to the extent that stacking of CNT sheets may be employed, such an approach can further reduce inter-sheet contact and can further minimize through-plane thermal conductivity by reducing phonon transport between the stacked layers of CNT sheets.

To further reduce phonon transport between layers of CNT sheets and further minimize normal-to-plane thermal conductivity of the CNT insulator of the present invention, in some embodiments, a spacer can be provided between adjacent CNT sheets. The spacer can be, for example, a plurality of alumina or ceramic dots, a layer of CNT sheet having a plurality of holes thereon, a porous layer of non-metal material, a CNT sheet having a rough surface with peaks and valleys thereon, or any combination thereof.

Figure 7:
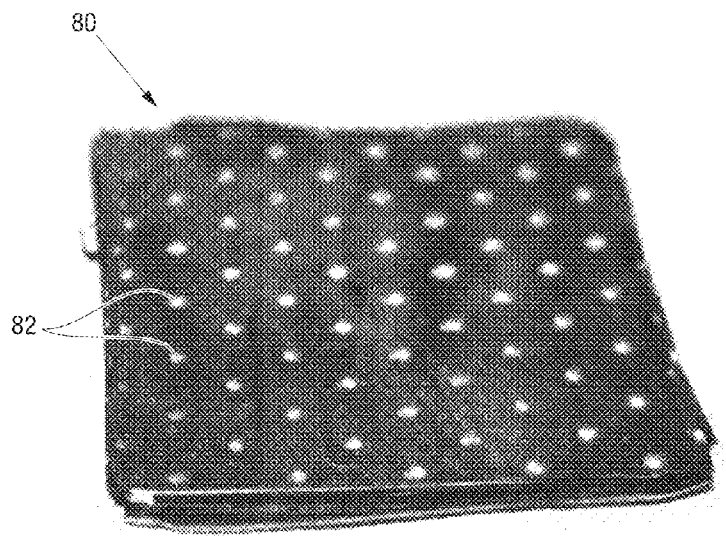
FIG. 7 illustrates a layered insulator in accordance with an embodiment of the present invention.

In one embodiment, a CNT insulator can be patterned with spacers 82, as shown in FIG. 7, to further increase inter-sheet thermal resistance. The spacers 82 can be oxide pillars (dots) that can substantially separate each CNT sheet from one another. Many types of oxide materials having low thermal conductivity, such as titanium oxide, zirconium oxide, tantalum oxide or the like, can be used as spacers 82. In another example, a matrix of alumina or ceramic dots can be deposited between two adjacent CNT sheets to create a gap therebetween. The alumina or ceramic dots, in one embodiment, can be sprayed onto the CNT sheets though a mask allowing deposition though predetermined holes. For example, a plurality of small cylindrical dots or pillars supporting each CNT sheet from an adjacent CNT sheet can be sprayed through the mask and deposited on each CNT sheet. The spacers 82 can be other particles deposited on a surface of a CNT sheet creating sufficient spacing between two adjacent sheets, such as other non-metal particles, ceramic spacers, plastic particles, silicone dots, etc. Patterns of spacers 82 can be geometric or random.

Figure 8:
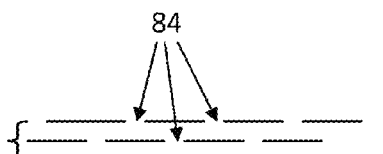
FIG. 8 illustrates a cross section view of a layered insulator in accordance with an embodiment of the present invention.

In another embodiment, holes, openings, slits, cavities, apertures, or any combination thereof can be provided (e.g., cut, engraved, punched, etc.) in each CNT sheet. The holes can be in a predetermined pattern that is the same or different for different CNT sheets. The predetermined pattern can be geometric or random. Thereafter, the CNT sheets can be so aligned that the hole pattern can be, for example, offset between two adjacent sheets, allowing each sheet to contain air pockets. For illustration purposes only, a layered CNT insulator 80 having three CNT sheets is shown in FIG. 8, where each sheet has a plurality of holes 84 therein. The holes 84 are not substantially aligned across the layers, rather, they are offset, to the extent desired, between two adjacent CNT sheets.

Figure 9:
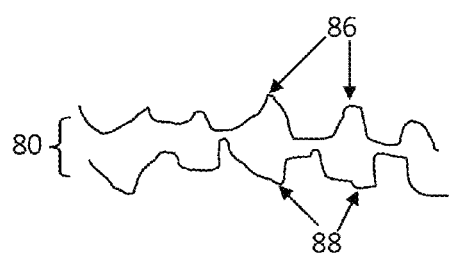
FIG. 9 illustrates a cross section view of a layered insulator in accordance with another embodiment of the present invention.

Spacing between two adjacent sheets can also be provided by texturing of the CNT sheets 80 (only two sheets shown for purpose of illustration only), as shown in FIG. 9. Each CNT sheet 80 can be designed to have a rough surface with peaks 86 and valleys 88 thereon. It should be appreciated that peaks and valleys are relative to one another. For example, when a sheet is turned upside down, peaks can become valleys and vice versa. The CNT sheets 80, when stacked on top of one another, can be situated in a way such that the peaks are offset between two sheets and sheet-to-sheet contacts are minimized.

Any of the doping, post production modifications and/or layering techniques described above can be combined or used in connection with one another.

Applications

Sheets of carbon nanotubes made from the present invention can have a wide variety of applications, including as an insulator. In an embodiment, thermal conductivity for a CNT sheet of the present invention without further processing (e.g., tube alignment) can be about 20 W/m·K. When the tubes are aligned (e.g., by stretching), in accordance with one embodiment of the present invention, the thermal conductivity can be increased to about 100 W/m·K within the plane and along the direction of alignment, while the thermal conductivity normal to the plane of the CNT sheet can be as low as about 1 W/m·K. In another embodiment, by layering a number of CNT sheets on top of one another and further reducing thermal contact (e.g., by creating a matrix of thermal insulating spacers, such as ceramic or other non-metal spacers), the resultant CNT insulating structure can have a thermal conductivity normal to the plane of the stacked CNT sheets less than about 1 W/m·K. In a particular embodiment, the normal-to-plane thermal conductivity of an insulator having such stacked CNT sheets ranges from about 0.01 W/m·K to about 0.5 W/m·K. An insulator having such stacked CNT sheets can also have a density of less than about 1 g/cc. In an embodiment, the density may be less than about 0.4 g/cc. In some cases, the insulator with such stacked CNT sheets can have an areal density of from about 0.01 $g/cm^2$ to about 0.5 $g/cm^2$ or from about 0.02 $g/cm^2$ to about 0.2 $g/cm^2$. In a particular embodiment, the areal density may be about 0.078 $g/cm^2$. Therefore, the CNT insulator of the present invention, when placed between a heat source and an area to which heat transfer may not be desired, can provide excellent normal-to-plane thermal insulation properties, while being conductive in-plane, and having sufficient structural integrity against damages.

Figure 10:
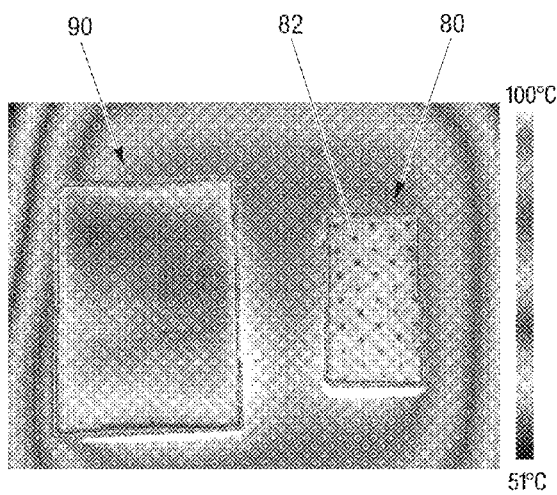
FIG. 10 illustrates a thermal image of a layered insulator in accordance with an embodiment of the present invention.

A CNT insulator produced in accordance with various embodiments of the present invention can be used as super-insulator. FIG. 10 shows a thermal image of a CNT super-insulator 80 (a CNT insulator having spacers 82 between adjacent sheets, shown on the right), compared with a commercial super-insulator 90 (an aerogel, shown on the left). The CNT super-insulator 80 and the aerogel 90 have substantially the same thickness. As shown, the background temperature is about 100° C. It was observed that the CNT super-insulator 80 displays substantially similar, and in some instances lower temperature than aerogel 90. Therefore, the CNT super-insulator 80 can have substantially similar, and in some instances superior thermal resistance than aerogel 90. In some embodiments, the CNT insulator can have thermal properties similar to aerogels, while having much higher strength and fracture toughness than aerogels.

The CNT insulator of the present invention may be incorporated into other structures for additional end use applications, such as sporting goods products, helmets, jackets (such as a fireman's jacket), antenna, morphing applications, aerospace, lightning protection flame proofing, etc. The CNT insulator may further be nickel free, meaning it may be less toxic than standard products. Additionally, the CNT insulator may be repairable to eliminate the need to replace the CNT sheets entirely or in part. In one embodiment, a CNT insulator may be formed by impregnating the CNT sheet with a matrix precursor, such as Krayton, vinyl ester, PEEK, bispolyamide, BMI (bismaleimide), epoxies, or polyamides, and subsequently allowing the matrix to polymerize or thermally cure.

Examples of specific applications of the CNT insulator of the present invention can also include electromagnetic interference shielding (EMI shielding) which may, reflect and absorb EMI radiation and thereby provide excelling shielding while at the same time providing very good insulation characteristics. Shielding may be beneficial to prevent interference from surrounding equipment and may be found in stereo systems, telephones, mobile phones, televisions, medical devices, computers, and many other appliances. This conductive layer may also be used as a ground plane or provide a means of creating an electromagnetic mirror.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

The invention claimed is:

1. An insulator comprising:
a plurality of nanotube sheets positioned on top of one another,
each sheet is wound about its central axis to form multiple distinct layers with a plurality of nanotubes in each distinct layer, the nanotubes being substantially contained within each distinct layer as to minimize normal-to-plane thermal conductivity between distinct layers; and
a plurality of spacers situated between adjacent nanotube sheets in order to reduce intersheet contact, so as to further minimize normal-to-plane thermal conductivity between the sheets.

2. The insulator of claim 1, wherein the nanotube sheets are defined by non-woven nanotubes.

3. The insulator of claim 1, wherein each nanotube sheet includes a dopant to decrease normal-to-plane thermal conductivity.

4. The insulator of claim 3, wherein the dopant is boron, carbon 13, an irradiated CNT material, or a combination thereof.

5. The insulator of claim 4, wherein the dopant is about 0.5 to about 5% weight percent boron.

6. The insulator of claim 4, wherein the dopant is about 2% weight percent boron.

7. The insulator of claim 1, wherein the plurality of nanotubes are substantially aligned in-plane to maintain the in-plane thermal conductivity.

8. The insulator of claim 1, wherein the plurality of spacers are alumina or ceramic dots situated between adjacent nanotube sheets.

9. The insulator of claim 1, wherein the plurality of spacers are a plurality of holes in each nanotube sheet.

10. The insulator of claim 1, wherein the plurality of spacers are provided by a porous layer of non-metal material having poor thermal conductivity and positioned between adjacent nanotube sheets.

11. The insulator of claim 1, wherein the plurality of spacers are provided by a texture in each nanotube sheet to define a rough surface having peaks and valleys thereon, so as to minimize surface contact between adjacent nanotube sheets.

* * * * *